(12) United States Patent
Wang

(10) Patent No.: US 12,422,560 B1
(45) Date of Patent: Sep. 23, 2025

(54) STABLE COHERENT LIDAR SYSTEM

(71) Applicant: Zoox, Inc., Foster City, CA (US)

(72) Inventor: Haiming Wang, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 974 days.

(21) Appl. No.: 17/535,368

(22) Filed: Nov. 24, 2021

(51) Int. Cl.
  *G01S 17/93* (2020.01)
  *G01S 7/481* (2006.01)
  *G01S 17/931* (2020.01)

(52) U.S. Cl.
  CPC ............ *G01S 17/931* (2020.01); *G01S 7/481* (2013.01)

(58) Field of Classification Search
  None
  See application file for complete search history.

(56) References Cited

U.S. PATENT DOCUMENTS

2013/0206963 A1* 8/2013 Grund .................... G02B 27/10
                                                    359/489.08

FOREIGN PATENT DOCUMENTS

WO    WO-2022093126 A1 * 5/2022 ............ G01S 17/08

\* cited by examiner

*Primary Examiner* — Hovhannes Baghdasaryan
(74) *Attorney, Agent, or Firm* — Lee & Hayes, P.C.

(57) ABSTRACT

A light detection and ranging (lidar) system for providing coherent lidar in environments and situations where disturbances are experienced without compromising quality of the coherent lidar data. The lidar system includes a light source that directs a linearly polarized beam to a polarization beam splitter where s-polarized and p-polarized components are separated with one traveling on to reflect off a target. A second component serves as a reference and reflects off the beam splitter along a separate axis. By passing through a quarter-wave plate upon exiting the beam splitter and upon returning through the quarter-wave plate, the polarization of each component is changed such that the beams combine along the second axis and proceed to an analyzer. The beam splitter and quarter-wave plates are monolithic to provide system stability during environmental disturbances.

20 Claims, 6 Drawing Sheets

STABLE COHERENT LIDAR SYSTEM

BACKGROUND

Vehicles (e.g., automobiles, trucks, construction equipment, farm equipment, automated factory equipment, autonomous vehicles) include sensors that obtain information about the vehicle operation and the environment around the vehicle. Some sensors, such as cameras, radar systems, and lidar systems can detect and track objects in the vicinity of the vehicle. A coherent lidar system transmits frequency-modulated continuous wave (FMCW) light and processes reflected signals to determine information about the target. Environmental disturbances can disturb a coherent lidar system and cause inaccuracies.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
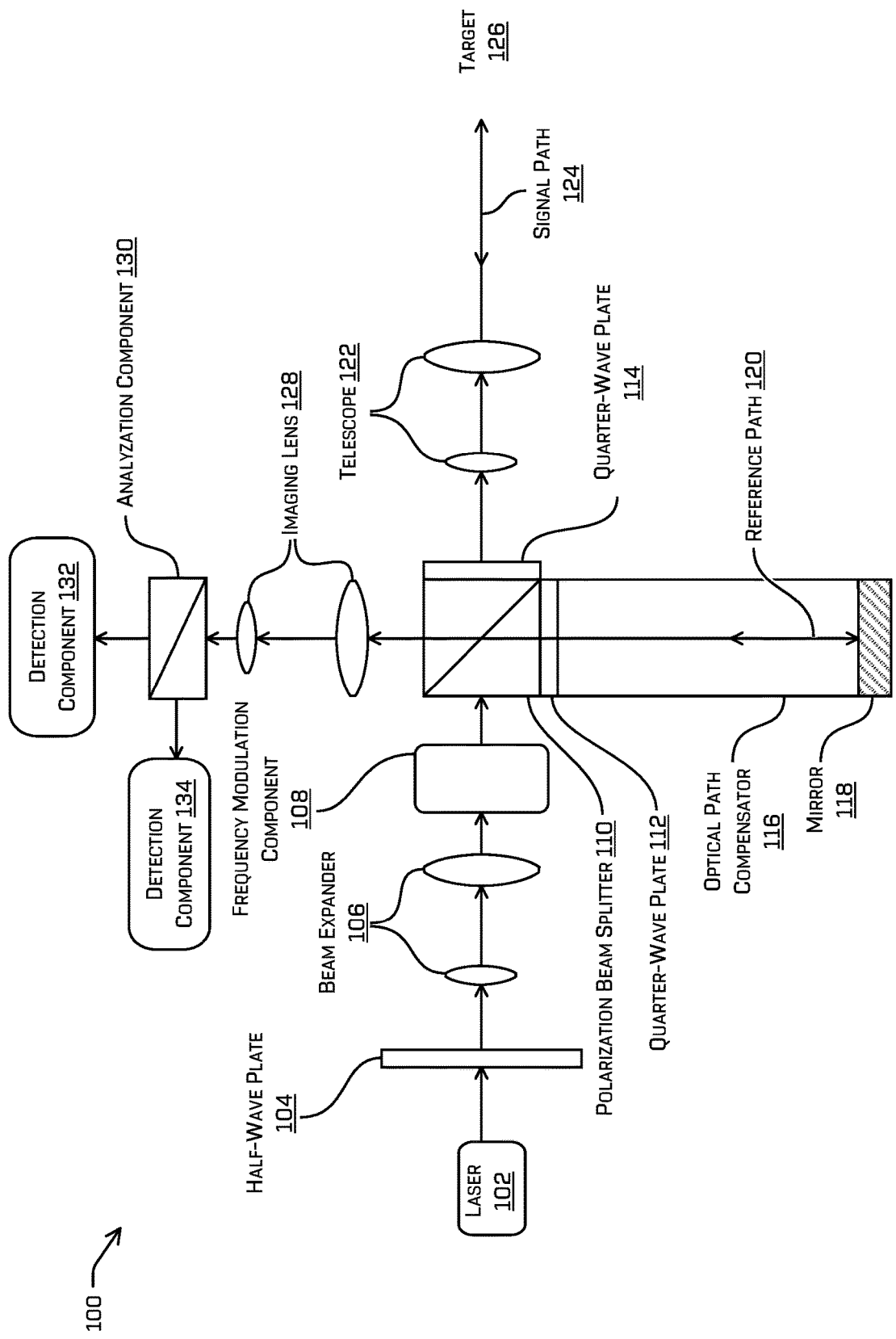
FIG. 1 is a schematic diagram of an example coherent lidar configuration, according to at least some examples.

This application relates to a system for a stable coherent light detection and ranging system that may be implemented in disturbed environments without impacting the performance of the coherent lidar system. Coherent lidar may use a reference signal or local oscillation to amplify a received signal, enabling shot noise limited detection, where the dominant component of received signal's noise may be shot noise from the local oscillator. Coherent lidar relies on Doppler effects to measure velocity and distance of a target object. To measure these Doppler effects, previous implementations have relied on a heterodyning operation which mixes a received light signal, reflected from the object, with an internally generated light signal derived from the lidar transmitted light signal. Heterodyne detection apparatuses are highly susceptible to environmental disturbances such as vibration, air turbulence, and temperature fluctuations that are common in vehicle operation and make use of coherent lidar difficult in vehicle applications. Coherent lidar in typical configurations may be difficult to implement in disturbed environments, e.g., where the environment, system, or surroundings are disturbed or perturbed in at least one manner such as temperature fluctuations, vibration, air movement, and other such perturbations. Disturbances to coherent lidar systems may cause the reference signal to be altered, and because coherent lidar, or heterodyne detection, may be based on interferometric detection, potential changes in the optical path length of the reference signal as a result of the perturbations may cause coherent lidar to be inaccurate in distance sensing, or even nonoperational.

Examples described herein provide for a stable coherent lidar system and enable use of highly accurate coherent lidar for various applications including autonomous vehicles, mobile applications, airborne applications, and other such applications in environments where disturbances are expected. The examples described herein provide the stable coherent lidar configuration by including a monolithic interference device as part of the lidar configuration. The monolithic device includes components of the interference device formed in a single unified physical structure. The monolithic device provides mechanical stability by having beam splitting, polarization plates, reflectors, and/or optical compensators physically coupled such that any vibrations or perturbations do not affect physical relationships (e.g., distance or alignment) between those elements. The interference device may include beam dividing and combining elements, such as a polarized beam splitter, as well as polarization control elements, optical path compensators, and/or reflector all in a monolithic structure. As a result, when the lidar apparatus undergoes environment disturbances, the impact from the disturbances may be minimized, thereby increasing the accuracy of the lidar apparatus. Accordingly, the optical path difference between the transmitted signal and the reference signal may be stable, thus enabling a high stability coherent lidar operation that may be used for autonomous vehicles in ranging objects in a surrounding environment while in motion and experiencing vibrations or other disturbances.

In some examples, the lidar system described herein uses a single optical emitter to measure velocity of a target object via Doppler effects. The transmitted signal reflects off a target object, and some of the reflected light may be detected by the lidar as received optical signals. The frequency difference between reflected signal and the reference signal may be compared with the frequency difference before reflection, and the result of the comparison may be used in a target object velocity and/or distance determination. Coherent detection as performed herein may also be referred to as heterodyne detection. Coherent detection creates an electrical beat frequency (e.g., a beat frequency may be a rate at which the signal oscillates from high to low and is the residual frequency when a waveform is subtracted from a second waveform and the two waveforms have different frequencies) present in the mixture of the two received optical signals, the reference signal, and the reflected signal. Characteristics of the received reflections (e.g. amplitude, frequency, phase, etc.) are used to determine position and/or velocity of the object or objects from which the received reflections were received. For example, a three-dimensional point cloud indicative of object positions (optionally associated with velocity information) can be generated based on the reflections.

In some examples, a vehicle, such as an autonomous vehicle or driver-operated vehicle, may include a coherent lidar system with a light source to output a continuous wave, and/or a modulator to modulate a frequency of the continuous wave and provide a frequency-modulated continuous wave (FMCW) signal. The coherent lidar system may also include a polarized beam splitter to split the FMCW signal to two or more paths based on differences in polarity (e.g., s-polarization versus p-polarization). One of the paths may act as a reference signal, e.g., a local oscillator, while the other path may be directed into the environment. A lens may be configured to obtain a receive beam resulting from a reflection of an output signal obtained from the FMCW signal. The vehicle may also include a vehicle controller to augment or automate operation of the vehicle based on information from the coherent lidar system, such as to provide distance, velocity, or other information about a target to an autonomous vehicle computing system or present to a user operating the vehicle.

In an illustrative example of the stable coherent lidar system, a light source may be used to produce a frequency-modulated laser beam. The frequency-modulated laser beam may be passed through a half-wave plate. The half-wave plate may be positioned adjacent the light source such that the laser beam passes through the half-wave plate immediately after leaving the light source. The linearly polarized, frequency-modulated laser beam, after passing the half-wave plate, may still be linearly polarized, but the polarization angle can be changed by rotating the azimuth angle of the half-wave plate. The adjustment of the polarization angle may allow dynamic and/or adaptive adjustment of the intensity ratio between the linearly and orthogonally polarized transmitted signal and local oscillator beams. In some examples, a first lens may then expand the laser beam into a suitable diameter for the intended purpose of the lidar device, which may be determined by the aperture of a second lens at an output end of the lidar system.

Next, in some examples, a frequency modulation component, such as a photoelastic modulator, may add an offset frequency either to the transmitted signal or the local oscillator beam. As a result, in a particular example, the local oscillator beam still remains the initial frequency, and the transmitted beam has an adjusted frequency. After the frequency modulation, the combined beam may then be directed to a polarized beam splitter, in which a first polarized component (e.g., s-polarized or p-polarized) is reflected towards a mirror and forms the local oscillator path while the second polarized component, different from the polarization of the first polarized component, passes through the polarized beam splitter towards the target, e.g., the transmitted beam.

Two quarter-wave plates are connected to the polarized beam splitter, at the outputs of the local oscillator and the transmitted beam. The transmitted signal, for illustration purposes having a p-polarization, passes through a quarter-wave plate, becoming circularly polarized. Circular polarization may be advantageous for illuminating the target because it maximizes reflected signal from the target. The transmitted signal is directed to the target via the second lens and then reflected back as a reflected signal, carrying the target information such as the distance to the target. The reflected signal passes back through the quarter-wave plate and the polarization is changed back to linearly polarized but is now s-polarized instead of p-polarized because the quarter-wave plate produces a phase shift equal to a quarter of a wavelength and by passing through the quarter-wave plate twice a phase shift of half a wavelength is introduced, changing the polarization from s-polarization to p-polarization and vice versa. Therefore, when the now s-polarized reflected signal arrives at the polarized beam splitter, it may be reflected towards an analyzation component.

The local oscillator beam, s-polarized initially, passes through a quarter-wave plate and becomes circularly polarized. The circularly polarized beam may be reflected back by the mirror and passes through the quarter-wave plate again. Similar to the transmitted signal, the local oscillator changes polarity and becomes p-polarized, so it can pass through the polarized beam splitter without reflecting, becoming collinear with the transmitted signal, resulting in interference of both beams. Because of the polarized beam splitter and the rotation of the polarization angle of each signal, none of the reflected signals return to the laser source. At the analyzer, the combined and/or interfering beams may be used to determine the distance to and/or velocity of the object.

The coherent lidar system described above enables high stability coherent detection as well as high efficiency photon budgeting because light in both polarization states may be fully used. In other words, without the configuration described above, a lidar system would need to use either a standard, non-polarization beam splitter, configuration, in which 50% of light will be sent back to the laser source, causing not only low photon budget efficiency but also laser instability; or use separated transmitted signals, in which the lidar system may be sensitive to environment perturbations because the optical path difference between the transmitted signal and/or the local oscillator may be susceptible to environment perturbations. In the coherent lidar system described herein, the monolithic configuration of a beam splitter, quarter-wave plates, optical path compensator, and reflector provides stability against temperature fluctuations and mechanical vibrations.

The techniques and/or systems described herein may be implemented in a number of ways. Example implementations are provided below with reference to the figures. The implementations, examples, and/or illustrations described herein may be combined.

FIG. 1 is a schematic diagram of a coherent lidar configuration 100, according to at least some examples. The coherent lidar configuration 100 may include a laser 102 that provides a source of laser light linearly polarized for use by the lidar system. The beam from the laser 102 may be frequency-modulated at the laser 102 or after emission from the laser 102, for example by the frequency modulation component 108. The beam may be linearly polarized in a first direction and may include both s- and p-polarization within the beam from the laser 102. The laser 102 emits the beam in a first direction, aligned along a first axis. In some examples, the beam emitted by the laser 102 may not be polarized, but may be from a light source that may be polarized by passing through additional optical elements such as polarizing filters.

The linearly polarized beam may pass through a half-wave plate 104. The half-wave plate 104 is positioned adjacent the laser 102 and may be positioned at an output of the laser 102. In some examples, the half-wave plate 104 may be positioned between the laser 102 and the beam expander 106 or other optical components such as the frequency modulation component 108 and/or the polarization beam splitter 110. The half-wave plate 104 may be a polarization rotator. The half-wave plate 104 enables adjustment of the intensity ratio between the s- and p-polarized beams of the linearly polarized laser. The adjustment of the intensity ratio adjusts the intensity ratio between a transmitted signal that will be directed at a target and/or a local oscillator beam that will be used as a reference signal and/or for interference with the received reflection of the transmitted signal. The half-wave plate 104 may be positioned downstream of the laser 102, between the laser 102 and a polarization beam splitter 110 where the reference and transmitted signals are separated. In some examples, the rotation as a result of the half-wave plate may be at a rotation of forty-five degrees. In such examples vertically polarized light may be rotated to be horizontally polarized and vice versa.

A beam expander 106, downstream of the laser 102, expands the beam from the laser to a diameter suited for the aperture of the lidar application. The beam expander 106 may be a lens that increases the beam diameter prior to entering the polarization beam splitter 110. The beam expander 106 may be positioned upstream or downstream of the half-wave plate 104, but before the splitter.

A frequency modulation component 108, such as a photoelastic modulator, may offset a frequency of the transmitted signal or the oscillator beam. As a result, one of the local oscillator or the transmitted signal remains the initial frequency, while the other has an adjusted frequency. After the frequency modulation component 108, the beams are then directed to a polarization beam splitter 110.

The polarization beam splitter 110, positioned downstream of the frequency modulation component 108 along the first axis, separates the beam into s-polarized and transmitted p-polarized beams. The s-polarized beam, which may be the local oscillator beam, may be entirely reflected by the polarization beam splitter 110 while the p-polarization beam, the transmitted beam, may be transmitted through towards the target, along the first axis. In some examples, the s-polarized beam may be reflected at an angle of ninety degrees, perpendicular to the first axis and/or the first direction, thereby directing the s-polarized beam along a second axis in a second direction towards a reflector. In some examples, the s-polarized beam may be reflected at an angle other than ninety degrees. It will be appreciated that in some examples, a polarization beam splitter may reflect p-polarized beams and transmit s-polarized beams as opposed to the configuration described above.

In some examples, the polarization beam splitter 110 may be a cube beam splitter, with the s-polarized beam emerging from a first face of the cube while the p-polarized beam emerges from a second face of the cube, the first face and second face perpendicular to one another. The cube splitter has a reflection plane at forty-five degrees with respect to the first axis (along the signal path 124). In other examples, a plate beam splitter may be implemented. The polarization beam splitter 110 may be coupled to a first quarter-wave plate 112 and/or a second quarter-wave plate 114. The first quarter-wave plate 112 may be positioned at the output of the polarization beam splitter 110 where the s-polarization beam emerges, the local oscillator beam. The second quarter-wave plate 114 may be positioned at the output of the polarization beam splitter 110 where the p-polarization beam is transmitted. In an example of a cube beam splitter, the first quarter-wave plate 112 may be coupled to the first face of the cube while the second quarter-wave plate 114 may be coupled to the second face of the cube as described above. The quarter-wave plates 112 and 114 are glued, adhered, or otherwise attached and/or integrally formed with the polarization beam splitter 110 with optical contact between the quarter-wave plates and the polarization beam splitter 110. In some examples, one or both of the quarter-wave plates 112 and 114 may be coupled to the polarization beam splitter 110 while the other may be physically separate.

The first quarter-wave plate 112 and/or the second quarter-wave plate 114 change the linearly polarized beams into circularly polarized beams. Circular polarization may be advantageous for illuminating the target because it maximizes reflected signal from the target. Additionally, because reflected signals will return through the quarter-wave plates when received at the polarization beam splitter 110, the signals may be combined and routed to the detection components. The reflection of the beam at the polarization beam splitter 110 perpendicular to the first axis, the axis of the laser 102, ensures that the reflected signals combine after being received back at the polarization beam splitter 110, with the reflected transmitted signal aligned with the second axis after reflecting at the polarization beam splitter 110.

After passing through the first quarter-wave plate 112, the local oscillator passes through an optical path compensator towards the mirror 118 and reflects back to the first quarter-wave plate 112. The local oscillator beam travels through an optical path compensator 116. The optical path compensator 116 may be used to cause an already existing path difference to be equal to zero or some constant value. The optical path compensator 116 may have the effect of altering the pathlength of the local oscillator based at least in part on expected distance to a target, for example in a range of five to one hundred meters. The optical path compensator 116 may have a variable optical path length that may be based on the expected distance to the target based on the use of the lidar system. The optical path compensator 116 may be formed of a high index material such as a glass having a refractive index at or above 1.6. The optical path compensator 116 may be coupled to the first quarter-wave plate 112 and may also be coupled to the mirror 118. In some examples, the optical path compensator 116 may be glued, adhered, and/or integrally formed with the quarter-wave plates. The affixed optical path compensator 116, quarter-wave plates 112 and 114, and beam splitter 110 may form a monolithic structure that is stable against thermal and mechanical fluctuation that may be experienced by a lidar system, for example when coupled to a vehicle system. The optical path compensator being affixed causes the beam splitter, quarter-wave plates, compensator, and/or mirror to all be a monolithic component that is highly stable in response to vibration disturbances, thermal expansions/contractions, etc. The reference path 120 (aligned along the second axis and perpendicular to the first axis) may then be the path of the local oscillator from the polarization beam splitter 110 along the second axis. The local oscillator beam first passes in a first direction along the second axis towards the mirror 118 and then reflects in a second direction opposite the first direction, along the second axis back towards the polarization beam splitter 110.

The local oscillator beam, s-polarized initially, passes through the first quarter-wave plate 112 and becomes circularly polarized. The circularly polarized beam may be reflected back by the mirror 118 and passes through the first quarter-wave plate 112 again. When the reflected signal returns to the first quarter-wave plate 112, the circularly polarized reflected signal changes to a linearly polarized beam as it passes through the first quarter-wave plate 112. The linearly polarized beam of the local oscillator may now be p-polarized after passing through the first quarter-wave plate 112 twice. The p-polarized beam of the local oscillator then transmits through the polarization beam splitter 110 without reflecting. In this manner, the local oscillator does not reflect back towards the laser 102 but instead entirely proceeds along the second axis towards the analyzer 130.

The p-polarized beam, the transmitted signal, passes through the polarization beam splitter 110 without reflection due to the polarization of the beam and the splitter. The p-polarized transmitted signal passes through the second quarter-wave plate 114 and becomes circularly polarized before proceeding along the signal path 124 (aligned with the first axis) to the target 126. The target 126 reflects the transmitted signal along the signal path 124 back to the polarization beam splitter 110. In some examples, the signal path passes through a telescope 122 that acts as the aperture of the lidar system. The telescope may focus the beam suitably for the lidar application.

The reflected transmitted signal returns through the quarter-wave plate 114 and changes from circularly polarized beam to a linearly polarized beam, though now having a s-polarization that may be reflected by the polarization beam splitter 110. The reflection may be directed along the second axis parallel with the reference path and combines the linear oscillator with the transmitted signal to interfere. The subsystem of the polarization beam splitter 110, the first quarter-wave plate 112, and the second quarter-wave plate 114 may be monolithic and enables high stability coherent detection due to the monolithic design.

The combined signal and local oscillator beams travel along the second axis towards the analyzer 130. The combined beams may pass through one or more imaging lenses, for example including imaging lens 128 before arriving at the analyzer 130. The imaging lenses may expand or focus the diameter of the beams. The interference of the beams enables determination of the lidar data from the transmitted signal based on differences between the beams and the difference determination according to coherent lidar detection techniques known to those with skill in the art. The analyzer 130 may be a linear polarizer, similar to the polarization beam splitter 110 that separates s-polarized beams and p-polarized beams into two separate beams and delivers them to detection components 132 and 134.

The coherent lidar system described above enables high stability coherent detection as well as high efficiency photon budgeting because light in both polarization states may be fully used. Without the configuration described above, lidar systems would need to use either a standard, non-polarization beam splitter, configuration, in which 50% of light will be sent back to the laser source, causing not only low photon budget efficiency but also laser instability; or uses separated transmitted signals, in which the lidar system may be sensitive to environment perturbations because the optical path difference between the transmitted signal and the local oscillator may be susceptible to environment perturbations.

Figure 2:
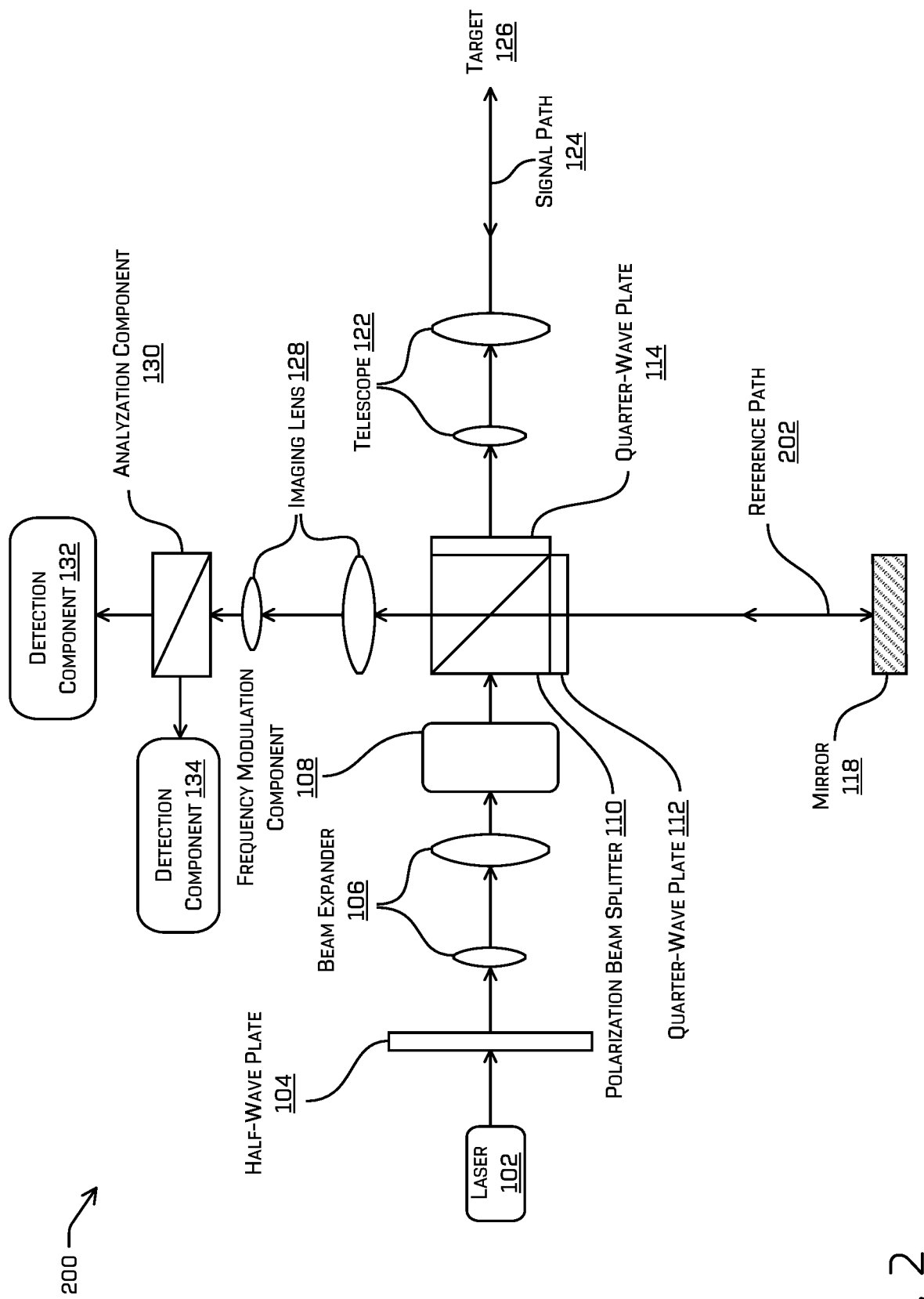
FIG. 2 is a schematic diagram of an example coherent lidar configuration, according to at least some examples.

FIG. 2 is a schematic diagram of an example coherent lidar configuration 200, according to at least some examples. The example configuration of FIG. 2 may include a laser 102, half-wave plate 104, beam expander 106, frequency modulation component 108, polarization beam splitter 110, first quarter-wave plate 112, second quarter-wave plate 114, mirror 118, telescope 122, signal path 124, target 126, imaging lens 128, analyzer 130, and/or detection components 132 and 134 as described above with respect to FIG. 1. Similar or identical components may be implemented in the coherent lidar configuration 200 shown in FIG. 2 where no optical path compensator is included. Though the optical path compensator 116 of FIG. 1 may increase stability with respect to vibratory disturbances, in some examples, such as with high temperature fluctuations, the optical path compensator 116 may be thermally unstable due to thermal expansion of the compensator in response to the temperature differences. In such examples, the reference path 202 may cause the local oscillator to pass through air to the mirror 118.

Figure 3:
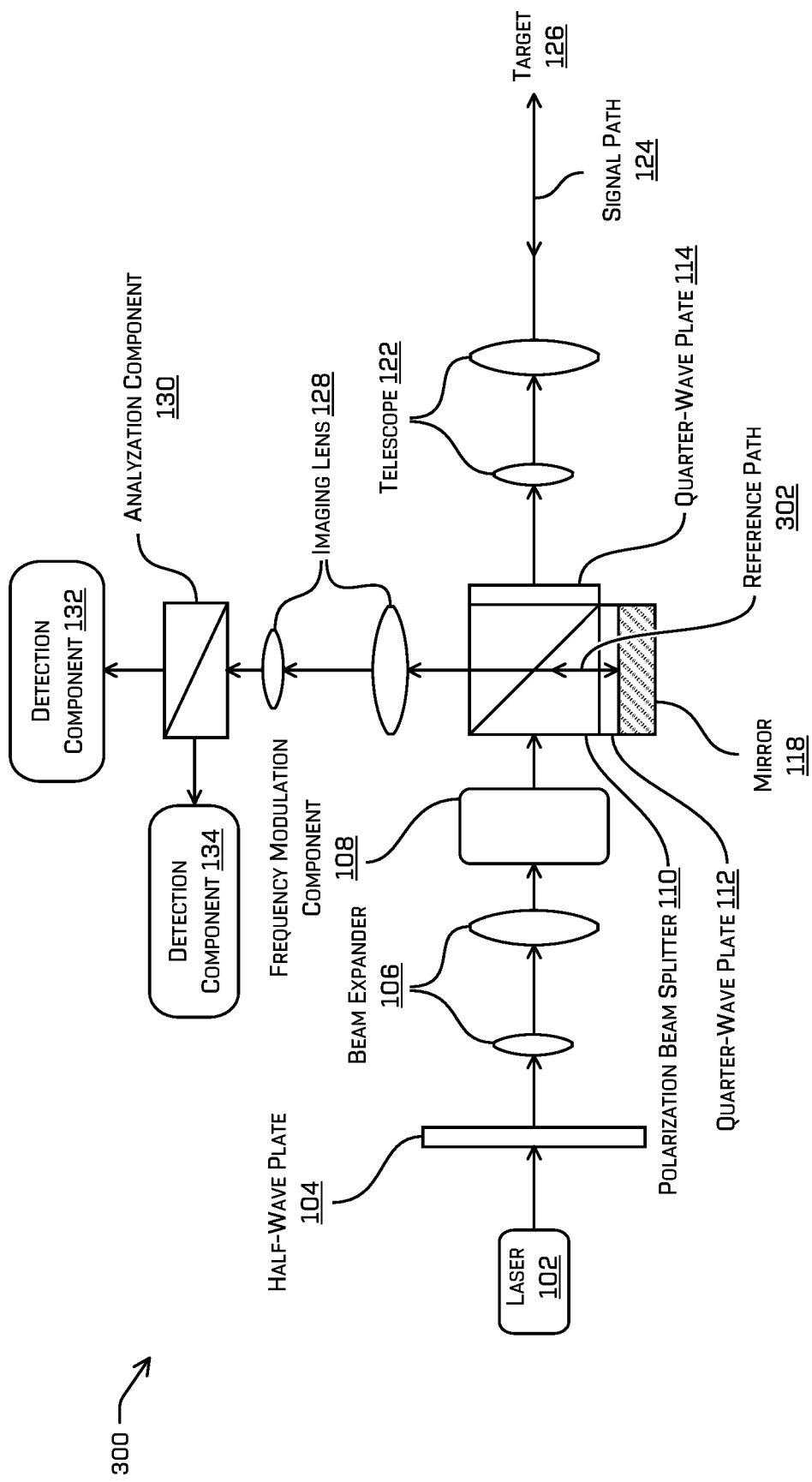
FIG. 3 is a schematic diagram of an example coherent lidar configuration, according to at least some examples.

FIG. 3 is a schematic diagram of an example coherent lidar configuration 300, according to at least some examples. The example configuration of FIG. 3 may include a laser 102, half-wave plate 104, beam expander 106, frequency modulation component 108, polarization beam splitter 110, first quarter-wave plate 112, second quarter-wave plate 114, mirror 118, telescope 122, signal path 124, target 126, imaging lens 128, analyzer 130, and/or detection components 132 and 134 as described above with respect to FIG. 1. Similar or identical components may be implemented in the coherent lidar configuration 300 shown in FIG. 3 where the reference path 302 passes directly from the first quarter-wave plate 112 to the mirror 118 without an air gap or an optical path compensator. In such examples, the local oscillator may have a very short path but may be stable with respect to both mechanical and/or thermal disturbances of the lidar system.

Figure 4:
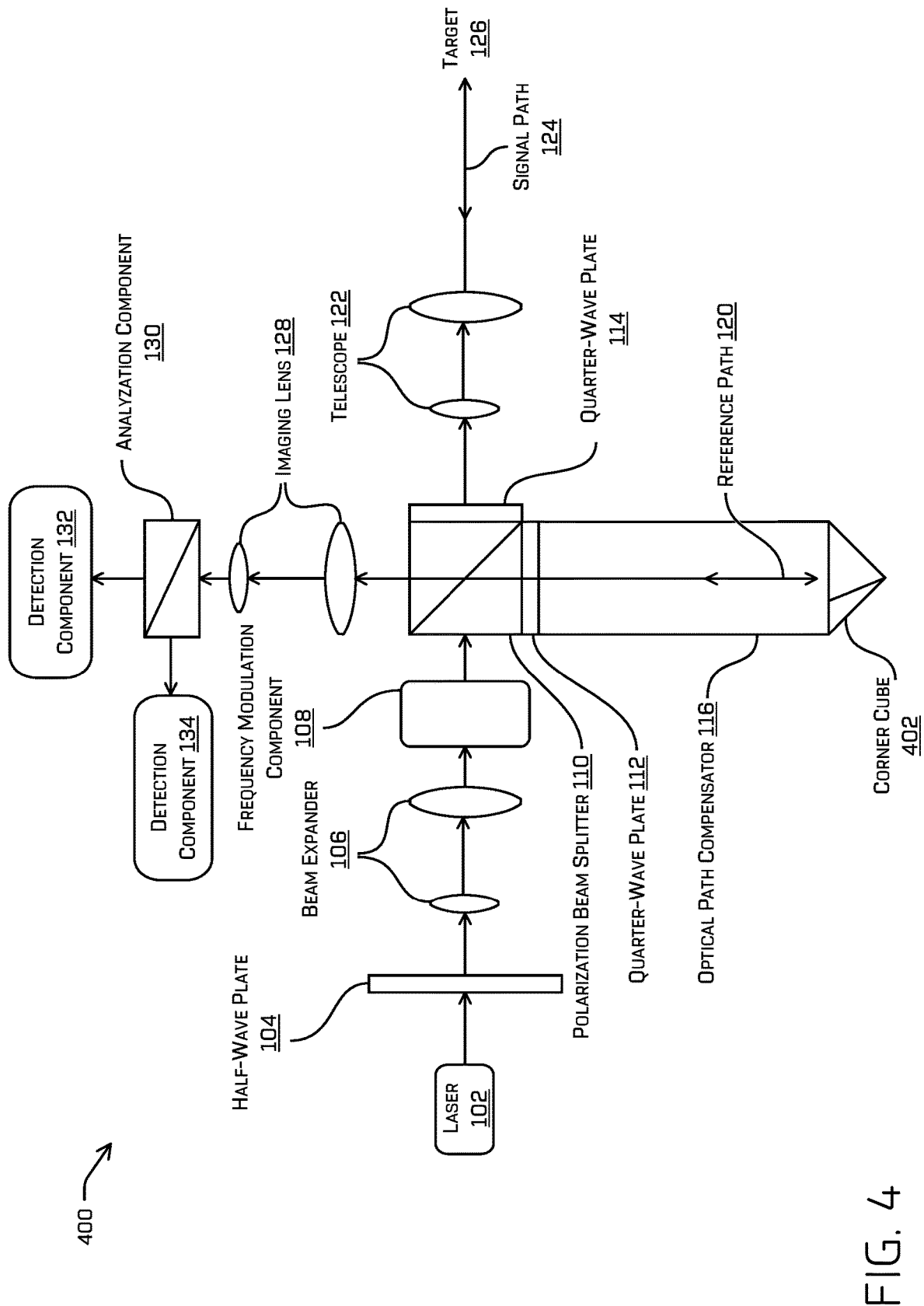
FIG. 4 is a schematic diagram of an example coherent lidar configuration, according to at least some examples.

FIG. 4 is a schematic diagram of a coherent lidar configuration 400, according to at least some examples. The example configuration of FIG. 4 may include a laser 102, half-wave plate 104, beam expander 106, frequency modulation component 108, polarization beam splitter 110, first quarter-wave plate 112, second quarter-wave plate 114, mirror 118, telescope 122, signal path 124, target 126, imaging lens 128, analyzer 130, and/or detection components 132 and 134 as described above with respect to FIG. 1. Similar or identical components may be implemented in the coherent lidar configuration 400 shown in FIG. 4 where a corner cube 402 replaces the mirror 118 of FIGS. 1-3. The corner cube 402 may be a retroreflector with three mutually perpendicular and intersecting flat surfaces. The corner cube 402 reflects the local oscillator beam colinear with the incident beam regardless of vibration or disturbances. Accordingly, the use of a corner cube 402 may introduce additional mechanical stability and may be implemented with any of the configurations of FIGS. 1-3.

Figure 5:
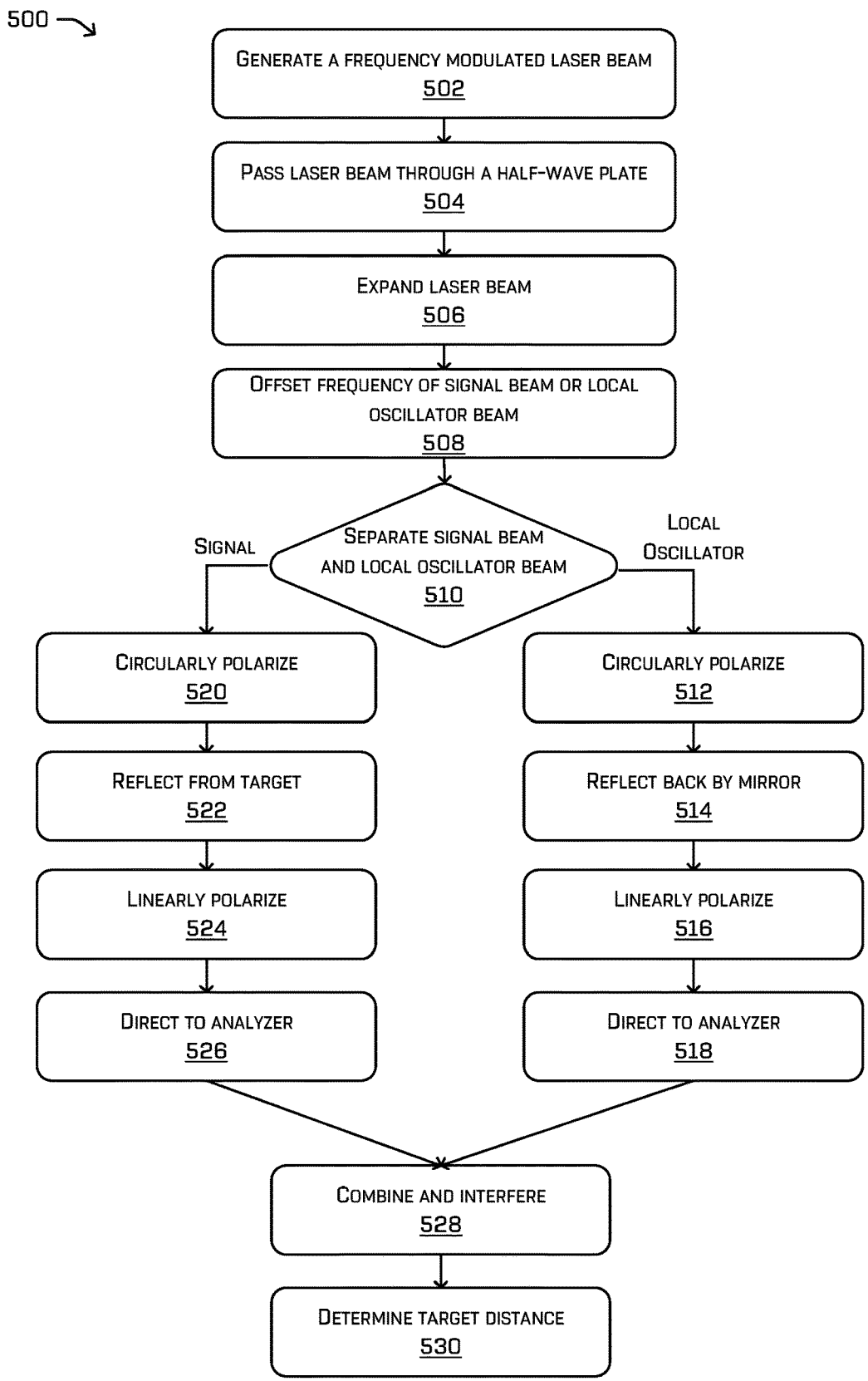
FIG. 5 is a block diagram of an example process for using a stable coherent lidar system as described herein, according to at least some examples.

FIG. 5 is a block diagram of an example process for using a stable coherent lidar system as described herein, according to at least some examples. In some examples, the process 500 can be implemented using components and/or systems illustrated in FIGS. 1-4 described above, although the process 500 is not limited to being performed by such components and may be performed, in whole or in part, by a separate system. Moreover, the components and/or systems of FIGS. 1-4 are not limited to performing the process 500.

At operation 502, the process 500 may include generating a frequency-modulated laser beam. The laser beam may be linearly polarized along a first axis, having a p-polarized component and an s-polarized component. In some examples, as described above, the beam may not be polarized from the light source but may be polarized by optical manipulators after light generation at a source. The laser beam may be generated by any suitable light source capable of producing a beam of linearly polarized light in a first direction. The p-polarized beam and the s-polarized beam may be the local oscillator and/or the transmitted signals of a lidar system. The different polarized beams (e.g., s-polarized and p-polarized) may mix to generate a coherent heterodyne signal that may be used by the lidar system to determine a distance and/or a velocity of a target based on heterodyne interference.

At operation 504, the process 500 may include passing the laser beam through a half-wave plate. The half-wave plate 104 may be a polarization rotator. The half-wave plate 104 enables adjustment of the intensity ratio between the s- and p-polarized beams of the linearly polarized laser. The adjustment of the intensity ratio adjusts the intensity ratio between a transmitted signal that will be directed at a target and a local oscillator beam that will be used as a reference signal and for interference with the received reflection of the transmitted signal.

At operation 506, the process 500 may include expanding the laser beam with a first lens. The first lens may be used to increase a diameter of the beam in accordance with an aperture size of a telescope of the lidar system.

At operation 508, the process 500 may include offsetting a frequency of the transmitted signal or the local oscillator beam. The frequency may be offset by a known amount. As a result, in a particular example, the local oscillator beam still remains the initial frequency, and the transmitted signal has an adjusted frequency.

At operation 510, the process 500 may include separating the transmitted signal and the local oscillator beam. The transmitted signal and the local oscillator beam may be separated by passing the laser beam through a polarization beam splitter with the s-polarized local oscillator reflected off along a second axis perpendicular to the first axis. The p-polarized transmitted signal may transmit through the polarization beam splitter.

At operation 512, the process 500 may include circularly polarizing the local oscillator beam after separating from the transmitted signal. The circular polarization may be accomplished by passing the local oscillator beam through a quarter-wave plate. The quarter-wave plate may be adhered to, integral with, or otherwise coupled to the polarization beam splitter such that vibration or disturbance does not disturb the transmission of the local oscillator beam.

At operation 514, the process 500 may include reflecting the local oscillator beam back colinear with the incident local oscillator beam using a reflector such as a mirror or a corner cube. The local oscillator may transmit across an air gap, optical path compensator, or minimal to nonexistent gap from the quarter-wave plate to the mirror. The reflected local oscillator may be returned to the quarter-wave plate along the second axis.

At operation 516, the process 500 may include linearly polarizing the reflected local oscillator beam. The local oscillator beam may be linearly polarized by passing through the quarter-wave plate as it returns along the second axis. By passing through the quarter-wave plate a second time, the originally s-polarized local oscillator may be changed to a linearly polarized p-polarized beam.

At operation 518, the process 500 may include directing the local oscillator beam to an analyzer. The local oscillator beam may be directed by transmitting across the polarization beam splitter, such as a cube beam splitter. The now p-polarized local oscillator beam may not be reflected by the cube beam splitter but instead traverses and proceeds along the second axis to the analyzer.

At operation 520, the process 500 may include circularly polarizing the transmitted signal from the polarization beam splitter. The circular polarization may be accomplished by passing the transmitted signal through a quarter-wave plate. The quarter-wave plate may be adhered to, integral with, or otherwise coupled to the polarization beam splitter such that vibration or disturbance does not disturb the transmission of the transmitted signal.

At operation 522, the process 500 may include reflecting the transmitted signal back from a target colinear with the incident signal. The reflected transmitted signal may be returned to the quarter-wave plate along the first axis.

At operation 524, the process 500 may include linearly polarizing the reflected transmitted signal from the target. The transmitted signal may be linearly polarized by passing through the quarter-wave plate as it returns along the first axis. By passing through the quarter-wave plate a second time, the originally p-polarized local oscillator may be changed to a linearly polarized s-polarized beam.

At operation 526, the process 500 may include directing the transmitted signal to an analyzer. The transmitted signal may be directed by reflecting at the polarization beam splitter, such as a cube beam splitter. The now s-polarized local oscillator beam may be reflected by the cube beam splitter along the second axis towards the analyzer.

At operation 528, the process 500 may include combining the transmitted signal and the local oscillator beam. The combined beams interfere with one another and may pass through one or more analysis lenses that may change a diameter of the beams.

At operation 530, the process 500 may include determining lidar data, such as estimated distance, estimated velocity, and/or other such data from the transmitted signal using the interference of the local oscillator. By mixing the reflected signal from the target with the local oscillator, the interference pattern and/or frequency difference of the local oscillator and return signal may be used to identify the estimated distance, estimated velocity, and/or other such data. Motion of the target toward or away from the lidar Doppler-shifts the reflected signal, so mixing it with the local oscillator that has not undergone any Doppler-shift directly measures velocity in the line of sight with a single observation. Further, by analyzing the intermediate frequency generated by mixing the reflected signal with the local oscillator measures object distance, and combining that with direction (determined based on the angle of the reflected signal) and velocity gives a three-dimensional location as well as velocity of the target simultaneously. In other words, FMCW lidar measures distance by repeatedly linearly chirping a frequency of the laser beam. The chirp may rise for a time longer than the light takes to reach the object, which then reflects the transmitted signal as the reflected signal. When the reflected signal is mixed with the local oscillator, a coherent detector, such as the detection components 132 and 134, mixes the local oscillator and the reflected signal and measures the difference frequency, which may indicate how much the frequency of the transmitted signal changed while the reflected signal made its round trip to the target. Multiplying that interval by the chirp speeds of the FMCW yields the distance to the target. Further processing extracts the Doppler-shift to yield the object's velocity relative to the lidar. The analyzer may split the combined beam after interference using a second polarization beam splitter to convey the local oscillator beam to a first detection component and the transmitted signal to a second detection component where the signals may be interpreted by a computing device to determine the lidar data. In some examples, the lidar data may then be used to control an operation of an autonomous vehicle or to provide data output to one or more vehicle systems.

Figure 6:
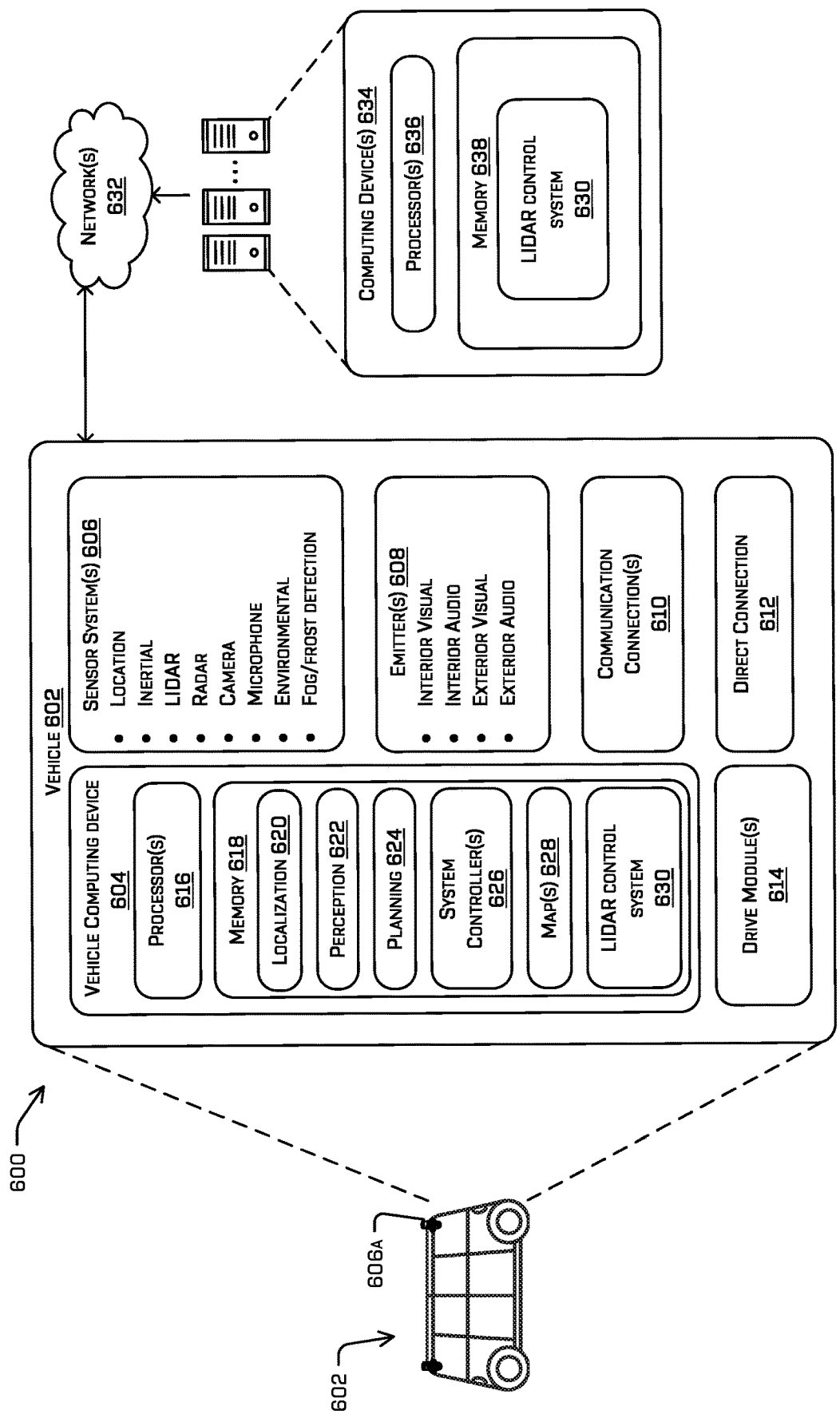
FIG. 6 depicts a block diagram of an example control system of a vehicle that may implement the coherent lidar system described herein.

FIG. 6 depicts a block diagram of a system 600 of vehicle 602 that may implement the coherent lidar system described herein. In at least some examples, the system 600 may include a vehicle 602. The vehicle 602 may include a vehicle computing device 604, one or more sensor system(s) 606, one or more of which implemented as a sensor system 606a as described herein, one or more emitters 608, one or more communication connection(s) 610, at least one direct connection 612, and/or one or more drive module(s) 614.

The vehicle computing device 604 may include one or more processor(s) 616 and memory 618 communicatively coupled with the one or more processor(s) 616. In the illustrated example, the vehicle 602 may be an autonomous vehicle. However, the vehicle 602 may be any other type of vehicle. In the illustrated example, the memory 618 of the vehicle computing device 604 stores a localization component 620, a perception component 622, a planning component 624, a lidar control system 630, one or more system controller(s) 626, and one or more map(s) 628. Though depicted in FIG. 6 as residing in memory 618 for illustrative purposes, it is contemplated that the localization component 620, the perception component 622, the planning component

624, the lidar control system 630, the one or more system controller(s) 626, and the one or more map(s) 628 may additionally, or alternatively, be accessible to the vehicle 602 (e.g., stored on, or otherwise accessible by, memory remote from the vehicle 602).

Regarding the system 600 shown in FIG. 6, in at least some examples, the localization component 620 may be configured to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some examples, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar system data (such as from the lidar control system 630), radar data, IMU data, GPS data, wheel encoder data, and the like to accurately determine a location of the autonomous vehicle. In some examples, the localization component 620 may provide data to various components of the vehicle 602 to determine an initial position of an autonomous vehicle for generating a candidate trajectory, as discussed herein.

In some examples, the perception component 622 may be configured to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 622 may provide processed sensor data that indicates one or more characteristics associated with a detected entity and/or the environment in which the entity may be positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories may be selected for the vehicle 602 to navigate.

In at least one example, the planning component 624 may determine a location of a user based on image data of an environment received from the user using, for example, bags of binary words with image-based features, artificial neural network, and the like. Further, the planning component 624 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 602 may stop to pick up a passenger. In at least one example, the planning component 624 may determine a pickup location based at least in part on determining a user identity (e.g., determined via image recognition or received as an indication from a user device, as discussed herein).

In other examples, the planning component 624 may alternatively, or additionally, use data from the perception component 622 to determine a path for the vehicle 602 to follow to traverse through an environment. For example, the planning component 624 may receive data from the perception component 622 regarding objects associated with an environment. Using this data, the planning component 624 may determine a route to travel from a first location (e.g., a current location) to a second location (e.g., a target location) to avoid objects in an environment. In at least some examples, such a planning component 624 may determine there is no such collision free path and, in turn, provide a path which brings vehicle 602 to a safe stop avoiding all collisions and/or otherwise mitigating damage. In examples, in conjunction with bringing vehicle 602 to a safe stop and/or mitigating damage in the event of a collision or predicted collision, planning component 624 can generate a trigger signal for one or more occupant protection systems.

In examples, a lidar control system 630 may be used to control and process signals received from a lidar system, such as shown and described above with respect to FIGS. 1-4. In examples, lidar control system 630 may be in communication with one or more sensor systems 606a either via wired connection, wirelessly, or a combination thereof. In examples, the lidar control system may trigger activation and/or adjustment in operation of the lidar system or portion thereof.

In at least one example, the vehicle computing device 604 may include one or more system controller(s) 626, which may be configured to control steering, propulsion, braking, safety, emitters, communication, and other systems of the vehicle 602. These system controller(s) 626 may communicate with and/or control corresponding systems of the drive module(s) 614 and/or other components of the vehicle 602.

The memory 618 may further include one or more map(s) 628 that may be used by the vehicle 602 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., lidar information from the lidar system, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more map(s) 628 may include at least one map (e.g., images and/or a mesh). In some examples, the vehicle 602 may be controlled based at least in part on the map(s) 628. That is, the map(s) 628 may be used in connection with the localization component 620, the perception component 622, and/or the planning component 624 to determine a location of the vehicle 602, identify objects in an environment, and/or generate routes and/or trajectories to navigate within an environment.

In some examples, the one or more map(s) 628 may be stored on a remote computing device(s) (such as computing device(s) 634) accessible via one or more network(s) 632. In some examples, multiple map(s) 628 may be stored based on, for example, a characteristic (e.g., type of entity, time of day, day of week, season of the year, etc.). Storing multiple map(s) 628 may have similar memory requirements but increase the speed at which data in a map may be accessed.

As shown in FIG. 6, in some examples, the logical or control portions of the lidar control system 630 may be stored in the memory 618 of the vehicle computing device 604 or remote from the vehicle 602 in the memory 638 of the computing device(s) 634. In some examples, some portions of the lidar control system 630 may be stored in the memory 618 of the vehicle computing device 604, and other portions of lidar control system 630 may be stored remotely in the memory 638 of the computing device(s) 634, and the separately located portions of the lidar control system 630 may operate together in a coordinated manner.

In examples, one or more of the sensor system(s) 606 may generate one or more signals indicative of an object (e.g., another vehicle, a wall, a guardrail, a bridge support, a utility pole, and/or a pedestrian) and communicate the one or more signals to the perception component 622 and/or the planning component 624, which may predict a collision with an object in the environment through which the vehicle 602 may be travelling and trigger a signal accordingly. In some examples, the sensor system(s) may include the lidar systems described herein that may provide lidar data for use by one or more additional systems of the vehicle 602. In examples, one or more of the sensor system(s) 606 may generate one or more signals indicative of direction of travel, vehicle status (e.g. acceleration, turning, and/or braking), and/or road conditions (e.g. presence and degree of obstacle one or more wheels have to travel over, and/or presence and degree of depression one or more wheels have to travel through), and communicate the one or more signals to the perception component 622, and/or the planning component 624, which may determine an event or predicted event and trigger one or more signals accordingly.

In at least one example, the sensor system(s) 606, including one or more encased sensor systems 606a, may include lidar systems, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 606, including one or more encased sensor systems 606a, may include multiple examples of each of these or other types of sensors. For example, the lidar systems may include individual lidar systems located at the corners, front, back, sides, and/or top of the vehicle 602 that may each be controlled by the lidar control system 630. As another example, the camera sensors may include multiple cameras disposed at various locations about the exterior and/or interior of the vehicle 602. The sensor system(s) 606 may provide input to the vehicle computing device 604. Additionally, or alternatively, the sensor system(s) 606 may send sensor data, via the one or more network(s) 632, to the one or more computing device(s) 634 at a particular frequency, after a lapse of a predetermined period of time, in near real-time, etc.

The vehicle 602 may also include one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 602 may also include one or more communication connection(s) 610 that enable communication between the vehicle 602 and one or more other local or remote computing device(s). For example, the communication connection(s) 610 may facilitate communication with other local computing device(s) on the vehicle 602 and/or the drive module(s) 614. Also, the communication connection(s) 610 may allow the vehicle 602 to communicate with other nearby computing device(s) (e.g., other nearby vehicles, traffic signals, etc.). The communications connection(s) 610 also enable the vehicle 602 to communicate with a remote teleoperation computing device or other remote services.

The communications connection(s) 610 may include physical and/or logical interfaces for connecting the vehicle computing device 604 to another computing device or a network, such as network(s) 632. For example, the communications connection(s) 610 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive module(s) 614. In some examples, the vehicle 602 may have a single drive module of the drive module(s) 614. In at least one example, if the vehicle 602 has multiple drive module(s) 614, individual drive module(s) 614 may be positioned on opposite ends of the vehicle 602 (e.g., the leading end and the rear, etc.). In at least one example, the drive module(s) 614 may include one or more sensor systems to detect conditions of the drive module(s) 614 and/or the surroundings of the vehicle 602. By way of example and not limitation, the sensor system(s) 606 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar systems, radar sensors, etc. Some sensors, such as the wheel encoders may be unique to the drive module(s) 614. In some cases, the sensor system(s) on the drive module(s) 614 may overlap or supplement corresponding systems of the vehicle 602 (e.g., sensor system(s) 606).

The drive module(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 may include a drive module controller, which may receive and preprocess data from the sensor system(s) 606 and to control operation of the various vehicle systems. In some examples, the drive module controller may include one or more processors and memory communicatively coupled with the one or more processors. The memory may store one or more modules to perform various functionalities of the drive module(s) 614. Furthermore, the drive module(s) 614 also include one or more communication connection(s) that enable communication by the respective drive module with one or more other local or remote computing device(s).

In at least one example, the direct connection 612 may provide a physical interface to couple the one or more drive module(s) 614 with the body of the vehicle 602. For example, the direct connection 612 may allow the transfer of energy, fluids, air, data, etc. between the drive module(s) 614 and the vehicle 602. In some examples, the direct connection 612 may further releasably secure the drive module(s) 614 to the body of the vehicle 602.

In at least one example, the localization component 620, perception component 622, the planning component 624, and/or the lidar control system 630, as described above, and may send their respective outputs, over the one or more network(s) 632, to one or more computing device(s) 634. In at least one example, the localization component 620, the perception component 622, the planning component 624, and/or lidar control system 630 may send their respective outputs to the one or more computing device(s) that make up vehicle computing device 604 at a particular frequency, after a lapse of a predetermined period of time, in near real-time, etc.

The processor(s) 616 of the vehicle 602 and/or the processor(s) 636 of the computing device(s) 634 may include any suitable processor capable of executing instructions to process data and perform operations as described herein. By way of example and not limitation, the processor(s) 616 and 636 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 638 are examples of non-transitory computer-readable media. The memory 618 and 638 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, for example as shown in FIG. 6, lidar control system 630 may include logic and/or hardware configured to receive the sensor signals from the lidar system and process the information to determine characteristics about the targets and the surrounding environment. As shown in FIG. 6, the components of lidar control system 630 may be associated with one or more of the vehicle computing device 604 on board the vehicle 602 or the computing device(s) 634.

In various implementations, the parameter values and other data illustrated herein may be included in one or more data stores and may be combined with other information not described or may be partitioned differently into more, fewer, or different data structures. In some implementations, data stores may be physically located in one memory or may be distributed among two or more memories.

Those skilled in the art will appreciate that the example architecture of system 600 shown in FIG. 6 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The system 600 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture of system 600. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture of system 600 may be transmitted to system 600 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

Example Clauses

A. An autonomous vehicle system, comprising: a lidar system comprising: a light source configured to emit a linearly polarized beam comprising a first polarized component and a second polarized component in a first direction; a first beam splitter positioned to receive the linearly polarized beam and: allow the first polarized component to pass through the first beam splitter in the first direction; reflect the second polarized component in second direction; a first quarter-wave plate aligned with the light source and coupled to the first beam splitter and configured to receive the first polarized component from the first beam splitter and output a first circularly polarized component into an environment; a second quarter-wave plate coupled to the first beam splitter and configured to receive the second polarized component reflected from the first beam splitter and output a second circularly polarized component in the second direction; a mirror configured to reflect the second circularly polarized component opposite the second direction into the second quarter-wave plate; and a second beam splitter on an opposite side of the first beam splitter from the mirror that receives light from the first beam splitter and separates the light into a first component directed to a first detection component and a second component directed to a second detection component; and circuitry configured to: determine an estimated distance based at least in part on the first component and the second component as detected by the first detection component and the second detection component; and control operation of the autonomous vehicle system based on the estimated distance.

B. The autonomous vehicle system of paragraph A, wherein the lidar system further comprising a half-wave plate aligned with and positioned between the light source and the first beam splitter.

C. The autonomous vehicle system of paragraph B, wherein the lidar system further comprises a frequency modulation component positioned between the half-wave plate and the first beam splitter.

D. The autonomous vehicle system of paragraph A, wherein the lidar system further comprises an optical path compensator comprising a refractive index of at least 1.6 and configured to alter a path of a local oscillator to a constant value based on an expected distance to a target, the optical path compensator positioned along the second direction and coupled at a first end to the second quarter-wave plate and at a second end to the mirror.

E. The autonomous vehicle system of paragraph D, wherein the optical path compensator is physically coupled to the second quarter-wave plate and the mirror is physically coupled to the optical path compensator.

F. A lidar system, comprising: a light source that emits a linearly polarized beam in a first direction along a first axis; a first beam splitter that allows a first type of linearly polarized light to pass through the first beam splitter in the first direction and reflects a second type of linearly polarized light in a second direction along a second axis perpendicular to the first axis, wherein the first type is different from the second type; a first quarter-wave plate aligned with the first axis, the first quarter-wave plate adjacent an output of the beam splitter; a second quarter-wave plate aligned along the second axis adjacent an output of the first beam splitter; a reflector aligned along the second axis in the second direction; and a detection component system aligned along the second axis on an opposite side of the first beam splitter from the second quarter-wave plate.

G. The lidar system of paragraph F, wherein the reflector is physically coupled with the second quarter-wave plate.

H. The lidar system of paragraph F, wherein the first quarter-wave plate and the second quarter-wave plate are physically coupled to the first beam splitter.

I. The lidar system of paragraph H, wherein the optical path compensator is physically coupled to the second quarter-wave plate.

J. The lidar system of paragraph F, further comprising: a half-wave plate positioned adjacent the light source; and a frequency modulation component positioned between the half-wave plate and the first beam splitter.

K. The lidar system of paragraph F, further comprising: a beam expander positioned between the half-wave plate and the frequency modulation component; and a telescope positioned along the first axis and configured to receive a beam from the first quarter-wave plate and direct it to a target.

L. The lidar system of paragraph F, wherein the reflector is coupled to the second quarter-wave plate.

M. The lidar system of paragraph F, wherein the reflector comprises a corner cube reflector.

N. The lidar system of paragraph F, wherein the first type of linearly polarized light comprises one of an s-polarized or p-polarized beam.

O. A lidar system, comprising: a light source configured to emit a linearly polarized beam; a beam splitter positioned along a first optical axis colinear with the linearly polarized beam such that a first portion of the linearly polarized beam passes through the first beam splitter along the first optical axis and a second portion of the linearly polarized light is reflected along a second optical axis normal to the first optical axis; and a first quarter-wave plate physically coupled to the beam splitter along the first optical axis; a second quarter-wave plate physically coupled to the beam splitter along the second optical axis.

P. The lidar system of paragraph O, further comprising, along the second optical axis, one or more of: a mirror, or a reflecting cube.

Q. The lidar system of paragraph O, wherein the first portion of light comprises one of an s-polarized or p-polarized beam.

R. The lidar system of paragraph O, further comprising a half wave plate along the first optical axis between the wave source and the polarizing beam splitter.

S. The lidar system of paragraph O, further comprising an optical path compensator positioned along the second optical axis and physically coupled to the second quarter-wave plate.

T. The lidar system of paragraph S, further comprising a mirror physically coupled to the optical path compensator.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

While one or more examples of the invention have been described, various alterations, additions, permutations, and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. An autonomous vehicle system, comprising:
a lidar system, comprising:
a light source configured to emit a linearly polarized beam comprising a first polarized component and a second polarized component in a first direction;
a first beam splitter positioned to receive the linearly polarized beam and:
allow the first polarized component to pass through the first beam splitter in the first direction; and
reflect the second polarized component in second direction;
a half-wave plate aligned with and positioned between the light source and the first beam splitter;
a frequency modulation component positioned between the half-wave plate and the first beam splitter;

a first quarter-wave plate aligned with the light source and coupled to the first beam splitter and configured to receive the first polarized component from the first beam splitter and output a first circularly polarized component into an environment;

a second quarter-wave plate coupled to the first beam splitter and configured to receive the second polarized component reflected from the first beam splitter and output a second circularly polarized component in the second direction;

a mirror configured to reflect the second circularly polarized component opposite the second direction into the second quarter-wave plate; and a second beam splitter on an opposite side of the first beam splitter from the mirror that receives light from the first beam splitter and separates the light into a first component directed to a first detection component and a second component directed to a second detection component; and circuitry configured to:
determine an estimated distance based at least in part on the first component and the second component as detected by the first detection component and the second detection component; and
control operation of the autonomous vehicle system based on the estimated distance.

2. The autonomous vehicle system of claim 1, wherein the lidar system further comprises an optical path compensator comprising a refractive index of at least 1.6 and configured to alter a path of a local oscillator to a constant value based on an expected distance to a target, the optical path compensator positioned along the second direction and coupled at a first end to the second quarter-wave plate and at a second end to the mirror.

3. The autonomous vehicle system of claim 2, wherein the optical path compensator is physically coupled to the second quarter-wave plate and the mirror is physically coupled to the optical path compensator.

4. A lidar system, comprising:
a light source that emits a linearly polarized beam in a first direction along a first axis;
a first beam splitter that allows a first type of linearly polarized light to pass through the first beam splitter in the first direction and reflects a second type of linearly polarized light in a second direction along a second axis perpendicular to the first axis, wherein the first type is different from the second type;
a half-wave plate aligned with and positioned between the light source and the first beam splitter;
a frequency modulation component positioned between the half-wave plate and the first beam splitter;
a first quarter-wave plate aligned with the first axis, the first quarter-wave plate adjacent an output of the first beam splitter;
a second quarter-wave plate aligned along the second axis adjacent an output of the first beam splitter;
a reflector aligned along the second axis in the second direction; and
a detection component system aligned along the second axis on an opposite side of the first beam splitter from the second quarter-wave plate.

5. The lidar system of claim 4, wherein the reflector is physically coupled with the second quarter-wave plate.

6. The lidar system of claim 4, wherein the first quarter-wave plate and the second quarter-wave plate are physically coupled to the first beam splitter.

7. The lidar system of claim 6, wherein the lidar system further comprises an optical path compensator that is physically coupled to the second quarter-wave plate.

8. The lidar system of claim 4, further comprising:
a beam expander positioned between the half-wave plate and the frequency modulation component; and
a telescope positioned along the first axis and configured to receive a beam from the first quarter-wave plate and direct it to a target.

9. The lidar system of claim 4, wherein the reflector is coupled to the second quarter-wave plate.

10. The lidar system of claim 4, wherein the reflector comprises a corner cube reflector.

11. The lidar system of claim 4, wherein the first type of linearly polarized light comprises one of an s-polarized or p-polarized beam.

12. A lidar system, comprising:
a light source configured to emit a linearly polarized beam;
a beam splitter positioned along a first optical axis colinear with the linearly polarized beam such that a first portion of the linearly polarized beam passes through the beam splitter along the first optical axis and a second portion of the linearly polarized beam is reflected along a second optical axis normal to the first optical axis;
a half-wave plate aligned with and positioned between the light source and the beam splitter;
a frequency modulation component positioned between the half-wave plate and the beam splitter;
a first quarter-wave plate physically coupled to the beam splitter along the first optical axis; and
a second quarter-wave plate physically coupled to the beam splitter along the second optical axis.

13. The lidar system of claim 12, further comprising, along the second optical axis, one or more of:
a mirror, or
a reflecting cube.

14. The lidar system of claim 12, wherein the first portion of light comprises one of an s-polarized or p-polarized beam.

15. The lidar system of claim 12, further comprising the half-wave plate along the first optical axis between the light source and the beam splitter.

16. The lidar system of claim 12, further comprising an optical path compensator positioned along the second optical axis and physically coupled to the second quarter-wave plate.

17. The lidar system of claim 16, further comprising a mirror physically coupled to the optical path compensator.

18. The autonomous vehicle system of claim 1, wherein the lidar system further comprises:
a reflector aligned in the second direction, wherein the reflector is physically coupled with the second quarter-wave plate.

19. The autonomous vehicle system of claim 1, wherein the lidar system further comprises:
a beam expander positioned between the half-wave plate and the frequency modulation component.

20. The autonomous vehicle system of claim 1, wherein the lidar system further comprises:
a telescope positioned along the first direction and configured to receive a beam from the first quarter-wave plate and direct it to a target.

* * * * *